Nov. 21, 1950 R. C. GOERTZ 2,530,387
MOTOR CONTROL CIRCUIT
Filed May 24, 1944
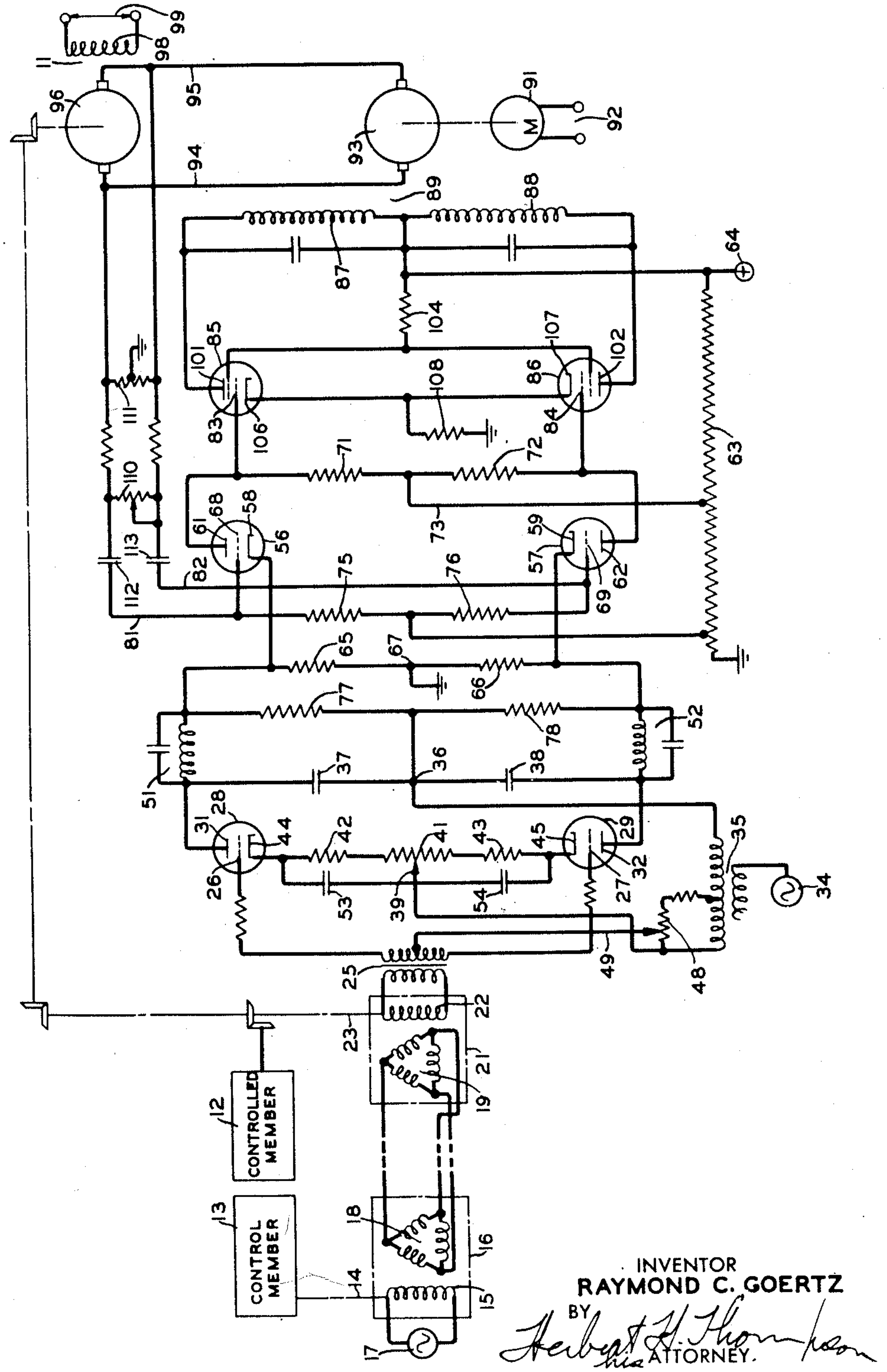
INVENTOR
RAYMOND C. GOERTZ
BY Herbert H. Thompson
his ATTORNEY.

Patented Nov. 21, 1950

2,530,387

UNITED STATES PATENT OFFICE 2,530,387

MOTOR CONTROL CIRCUIT

Raymond C. Goertz, Hempstead, N. Y., assignor to The Sperry Corporation, a corporation of Delaware Application May 24, 1944, Serial No. 537,100

22 Claims. (Cl. 318—30)

This invention relates to a mixer amplifier for control circuits and particularly concerns an improvement in the mixer amplifier circuit disclosed in copending application Serial No. 530,227, filed in the name of Rawley D. McCoy, and now U. S. Patent No. 2,478,203, issued August 9, 1949.

An object of this invention is to provide an amplifier for mixing and amplifying two control signals to control a motor according to the algebraic sum or difference of these signals in which the grid bias is not critical.

Another object of the invention is to provide a balanced mixer amplifier for a motor control circuit which operates in a stable manner independent of fluctuation in power supply or change in other characteristics of the circuit.

A further object of the invention is to provide a mixer amplifier in which one signal is applied to the cathodes and another signal is applied to the control grids of a pair or electron discharge devices arranged in balanced circuit in which the operation of the circuit depends solely upon differential potentials applied to the grids and cathodes.

Other objects and advantages of this invention will become apparent from the specification, taken in connection with the accompanying drawing which is a schematic wiring diagram of a positional control circuit emboying the invention.

One advantageous use of the present invention is in a mixer amplifier for a motor control circuit in which a pair of electron discharge tubes, each including at least three electrodes, are connected in a balanced circuit with suitable symmetrically arranged impedances in the form of resistances connected between corresponding electrodes of each of the tubes and balanced relative to a power source supplying energy to the circuit. A first control signal, for example, the error signal in a positional control system is used to differentially adjust the potentials of the cathodes of the electron discharge devices, and a second signal which may be developed according to the speed of the controlled motor is used to differentially adjust the potentials of the grids of these devices.

In the preferred form of the invention, a relatively high impedance is connected between the cathodes of the mixer tubes and the center point of this impedance is connected to the power supply to introduce considerable degeneration for equal changes in the potentials of the corresponding electrodes of the two tubes. This high impedance, which may be a pair of large cathode resistors, provides a bias potential between the grids and cathodes that maintains the operation of the tubes on a substantially linear portion of their characteristic curves regardless of fluctuations in supply voltages and other circuit variations. A relatively low shunt impedance is connected across the cathode impedance to reduce the degeneration and increase amplification for potentials applied differentially to the two tubes. With this arrangement, the bias of the individual tubes is continuously such that the difference between their respective space currents is substantially proportional to the algebraic difference between the differentially applied signals.

This difference between the space currents controls a balanced power amplifier circuit which adjusts the field currents in opposing field windings according to the difference between the space currents in the electron discharge devices and thereby controls the voltage applied to a motor, to vary the speed of the motor according to the algebraic difference of the signals.

The drawing shows a positional control system for operating a motor 11 to position a controlled member 12 according to or synchronously with the position of a control member 13. The control member 13 is connected as by shaft 14 to position rotor 15 of a conventional synchro-generator 16 which may be of the "Selsyn" "Telegon" or "Autosyn" type well known in the art. The rotor winding 15 is energized by a suitable source of alternating current 17, and induces a voltage in polyphase stator winding 18 which is connected to a corresponding polyphase winding 19 of a synchro-transformer 21, having a rotor winding 22 positioned as by shaft 23 according to the position of the controlled member 12. As is well known in this type of transmission system, a reversible phase variable magnitude alterating voltage is induced in the rotor winding 22 depending upon the direction and magnitude of the displacement of the two rotor windings 15 and 22 from their synchronous position, which displacement corresponds to the displacement between the controlled and control members 12 and 13 respectively.

This reversible phase variable magnitude alternating voltage may be coupled as by a transformer 25 to be applied in phase opposition to grids 26 and 27 of a pair of triodes 28 and 29 which are connected in a well-known phase sensitive balanced demodulator circuit. An alternating voltage is applied to plates 31 and 32 of the tubes 28 and 29 from a source 34 which may be the same as, or synchronized with, the source 17. Voltage from the source 34 is supplied as by transformer 35 to a center point 36 between condensers 37 and 38 which are connected to the plates 31 and 32 and through slider 39 of variable resistor 41 as well as cathode resistors 42 and 43 to cathodes 44 and 45 of the tubes 28 and 29. The slider 39 may be adjusted to properly balance the circuits of the tubes as desired. In this way, the alternating voltage is applied in like phase between the cathodes and plates of the two demodulator tubes. To provide a suitable bias for the tubes 28 and 29 a potentiometer 48 is connected across a portion of the secondary winding of transformer 35 and has its slider connected as by lead 49 to the center point of the secondary of transformer 25 in a manner such that appropriate positive bias is applied to the grids 26 and 27 for half cycles during which a positive voltage is applied to the plates 31 and 32.

With the circuit described above, the potential of the plates 31 and 32 includes a unidirectional component that varies differentially according to the phase and magnitude of the error signal from the rotor winding 22. This unidirectional component is smoothed by filter circuits 51 and 52 to provide a differentially variable unidirectional voltage that is proportional to the error signal. In motor control circuits of this type, it is usually desirable to modify this error signal according to its rate of change. One arrangement for introducing a rate component is by connecting condensers 53 and 54 across cathode resistors 42 and 43. By appropriately selecting values of these condensers and resistors, that is, a large capacity condenser as compared to the resistance of the resistors at the frequencies used in the system, the unidirectional components of the potentials of plates 31 and 32 will be dependent upon the error signal as well as its rate of change and may be referred to as a composite signal including both displacement and rate components; it is a composite error and error rate signal.

The mixer amplifier embodying the present invention includes a pair of electron discharge tubes 56 and 57 having their cathodes 58 and 59 and anodes 61 and 62 connected in a balanced circuit with respect to a voltage divider 63 that is connected across a source 64 of positive potential from a suitable power supply. The cathodes 58 and 59 are connected together by a relatively high cathode impedance in the form of relatively large cathode resistors 65 and 66 having their center point grounded at 67. These high cathode resistors cause considerable degeneration to reduce amplification of fluctuations in the power supply, or other variations in circuit characteristics and produce a bias potential between cathodes 58 and 59 and grids 68 and 69 of the tubes 56 and 57, respectively. In this manner, the mixer amplifier circuit is automatically biased to operate the tubes 56 and 57 on a linear portion of their mutually characteristic curves, which is essential to obtain the sum or difference of two signals rather than modulation as will subsequently appear.

The plates 61 and 62 are connected through load resistors 71 and 72 and a lead 73 to a selected point on the voltage divider 63 to provide appropriate potentials for the plates. Grids 68 and 69 are respectively connected to one end of symmetrically arranged resistors 75 and 76, the other ends of said resistors being connected through a common lead to a point on the voltage divider 63, as shown, which provides a small positive voltage on the grids to maintain a minimum space current in the tubes 56 and 57.

The mixer amplifier thus far described is a balanced amplifier having relatively high cathode resistors for automatically maintaining a grid bias to operate the tubes on linear portions of their characteristic curve, and produce considerable degeneration to avoid changes or fluctuations in the space current of the tubes.

In order to increase the amplification of the mixer for signals differentially applied to its cathodes or grids, a relatively low shunt impedance in the form of small shunt resistors 77 and 78 are connected across the high cathode resistors and have their mid-point connected to the mid-point 36 of the balanced phase sensitive demodulator circuit. Since the shunt resistors are relatively small, any difference between the space currents of the mixer tubes 56 and 57 will flow through the low shunt impedance rather than the relatively high cathode impedance, thereby reducing degeneration and correspondingly increasing amplification of the mixer amplifier for the space current differential.

The differential potential of the plates 31 and 32 of the demodulator tubes is supplied through the filters 51 and 52 to apply the unidirectional component across the shunt resistors 77 and 78 to control the differential potential of cathodes 58 and 59 of the mixer tubes 56 and 57. Since the shunt resistors 77 and 78 are connected to the mid-point 36 of the demodulator plate circuits, unidirectional voltages appearing equally across these resistors do not affect the potential of mixer cathodes 58 and 59. However, a difference between the voltages across the shunt resistors 77 and 78 as the result of an error signal from the transmission system applies a differential potential across cathode resistors 75 and 76 thereby differentially adjusting the potentials of mixer cathodes 58 and 59 and causing a difference between the space currents of the two mixer tubes dependent upon the error signal. During quiescent conditions the cathodes 58 and 59 of the mixer tubes will be at the same positive potential with respect to ground, but, under other conditions when an error signal is present, will change differentially, that is, one will become more positive and the other less positive, according to the magnitude of the error signal from rotor winding 22.

A second control signal in the form of a velocity signal is connected by leads 81 and 82 to grids 68 and 69 for differentially varying the potentials of these grids, that is, by changing one positive and the other negative with respect to ground depending upon the desired effect of the signal.

Since the tubes are biased to operate on the linear portion of their characteristic curves, changes in their respective space currents will be proportional to the changes in the voltages between their grids and cathodes since the plate voltage is maintained substantially constant. In addition the space currents in these two tubes will be equal under quiescent conditions. However, when the potentials of the grids and/or cathodes are varied differentially the space current will likewise vary differentially and the difference between the space currents will be proportional to the algebraic difference between the differential potentials applied to the cathodes and the grids corresponding to the error signals and the speed or velocity signal, respectively.

This difference in space currents will develop a differential voltage across resistors which may be applied to grids 83 and 84 of power amplifier tubes 85 and 86 which are also arranged in a balanced circuit having their plates connected through opposing windings 87 and 88 of the field for a direct current generator 89 of a variable speed drive known as the Ward-Leonard type. As is well known, this type of variable speed drive includes a constant speed motor 91 energized from any suitable source 92 for driving armature 93 of the generator 89. The voltage generated in armature 93 is connected as by leads 94 and 95 to an armature 96 of the motor 11, having its field 98 connected to a constant source 99.

The plates 101 and 102 of the tubes 85 and 86 are connected through the field windings 87 and 88 to the source of positive potential 64. This source is also connected through a dropping resistor 104 to the screen grids of the tubes 85 and 86 and cathodes 106 and 107 of these tubes are connected through a common cathode resistor 108 to ground.

Since the potentials of control grids 83 and 84 are varied differentially according to the combined error and velocity signals, the space currents in these tubes are likewise varied differentially so the resultant field of opposed windings 87 and 88 causes the generator 89 to produce a voltage of a polarity and magnitude corresponding to the combined signals from the mixer amplifier. This voltage is applied to the armature 96 of the motor 11 to drive the motor at a rate proportional to the combined signals. Since the voltage applied to the armature 96 is substantially proportional to the speed of the motor this voltage may be used as a velocity signal to be applied to the grids 68 and 69 of the mixer amplifier tubes. A suitable resistor 111 having its center point connected to ground is connected across leads 94 and 95 so the voltage across this resistor will vary differentially with respect to ground according to the velocity of motor 11. This voltage is supplied across a potentiometer 110, through condensers 112 and 113, and by leads 81 and 82 to grids 68 and 69 respectively. The magnitude of the voltage applied to the grids is controlled by the setting of the slide of the potentiometer 110. The purpose of the condensers 112 and 113 is to block the speed voltage except during changes in the velocity of the motor.

In the circuit described above, the error and error rate signals from the balanced phase sensitive demodulator circuit normally control a motor to drive at a velocity proportional to the error and error rate. In order to avoid "hunting" some velocity damping is desired. Hence the circuit shown drives the motor 11 at a velocity proportional to the difference between the voltage corresponding to the composite error and error rate signal from the demodulator and the velocity damping voltage applied to the grids 68 and 69. Since this damping is only necessary during accelerations of the motor 11, the condensers 112 and 113 serve to eliminate it during constant velocity periods. This type of velocity damping signal is sometimes referred to as a "speed lag voltage with wipe-out."

When a positional error occurs between controlled member 12 and control member 13, an error signal is applied to the balanced phase sensitive demodulator which produces a unidirectional voltage including both error and error rate components. This voltage is used to differentially adjust the potential of the cathodes in the two tubes includes in the balanced mixer amplifier circuit. The velocity damping voltage from the armature circuit of motor 11 is applied to grids 68 and 69 to differentially vary the potentials of these grids with respect to their cathodes according to the velocity of the motor 11.

The mixer amplifier tubes 56 and 57 are biased to a point on the linear portion of the characteristic curves so their respective space currents depend upon the algebraic differences between the voltages applied to their respective cathodes and grids. By this arrangement the difference in the space currents in the tubes 56 and 57 is proportional to the algebraic difference between the differential voltage applied to the cathodes and the differential voltage applied to the grids. This difference in space currents controls the power amplifier circuit including the tubes 85 and 86 to vary the currents in opposed field coils 87 and 88.

In the mixer amplifier circuit described, the output potential represented by the voltage across load resistors 71 and 72 remains substantially constant under quiescent conditions, that is, when there is no signal voltage, since the high degeneration provided by cathode resistors 75 and 76 avoids the amplification of fluctuations in the power supply or other changes in characteristics of the circuit. This arrangement also automatically maintains an appropriate bias potential between the cathodes and grids of the mixer tubes to continuously operate the mixer amplifier tubes on a linear portion of their mutual characteristic curves within comparatively wide variations in potentials applied equally to corresponding electrodes of the tubes. Potentials applied equally to the cathodes or grids of the two tubes will not materially affect their space currents because the high cathode impedance provides considerable degeneration for currents passing equally through the two tubes, since such currents return to the power supply through ground connection 67.

However, for signals applying differential potentials to either the grids or cathodes of the mixer tube, the differential space current passes through the relative low impedance formed by shunt resistors 77 and 78 that are connected between the two cathodes 58 and 59. This shunting of the differential space current avoids the degenerative effect of the large cathode resistors and permits much higher amplification of the signals applied differentially to the cathodes or grids of the two tubes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a motor control circuit, a mixer amplifier for combining a pair of control signals to jointly control the operation of a motor comprising a pair of electron discharge devices having their cathodes, control electrodes and anodes arranged in a balanced circuit with a power supply, cathode impedances connected between the cathodes of each of said devices and said supply for controlling the potentials of said cathodes relative to said supply according to the respective space currents of said devices, means external to said anode cathode circuit and responsive to a first control signal for differentially varying the potential drop across said cathode impedances to differentially adjust the potentials of said cathodes relative to said supply, and means responsive to a second control signal for differentially adjusting the potentials of said control electrodes relative to said supply.

2. In a motor control circuit, a mixer amplifier for combining a pair of control signals to jointly control the operation of a motor comprising a pair of electron discharge devices having their cathodes, control electrodes and anodes arranged in a balanced circuit with a power supply, cathode impedances connected between the cathodes of each of said devices and said supply for controlling the potentials of said cathodes relative to said supply according to the respective space currents of said devices, means external to said anode cathode circuit and responsive to a first control signal for differentially varying the potential drop across said cathode impedances to differentially adjust the potentials of said cathodes relative to said supply, means responsive to a second control signal for differentially adjusting the potentials of said control electrodes relative to said supply, said control electrodes and said cathodes being interconnected to bias said devices in a manner such that the difference between their space currents is substantially proportional to the difference between the differential potentials of said cathodes and said control electrodes.

3. In a motor control circuit, a mixer amplifier comprising a pair of electron discharge devices having their cathodes and anodes arranged in a balanced circuit with a power supply, a relatively high cathode impedance connected between the cathodes of said devices and said supply, and a relatively low shunting impedance connected across said cathode impedance and external to said anode cathode circuit, said cathode and shunt impedances being arranged and connected in a manner such that said cathode impedance provides degeneration of space currents passing equally through said devices and said shunt impedance reduces degeneration for the difference between the space currents of said devices.

4. In a motor control circuit, a mixer amplifier comprising a pair of electron discharge devices having their cathodes and anodes arranged in a balanced circuit with a power supply, a relatively high cathode impedance connected between the cathodes of said devices and said supply, a relatively low shunting impedance connected across said cathode impedance and external to said anode cathode circuit, said cathode and shunt impedances being arranged and connected in a manner such that said cathode impedance provides degeneration of said currents passing equally through said devices and said shunt impedance reduces degeneration for the difference between the space currents of said devices, and means responsive to a first control signal for applying a potential across said shunt impedance to differentially vary the potentials of said cathodes for producing a difference between the space currents of said devices dependent upon said signal.

5. In a motor control circuit, a mixer amplifier comprising a pair of electron discharge devices having their cathodes, control electrodes and anodes arranged in a balanced circuit with a power supply, a relatively high cathode impedance connected between said cathodes and said supply, said cathodes and control electrodes being interconnected to bias said devices in a manner such that changes in the potentials between said cathodes and control electrodes produce a substantially proportional change in the space currents of said devices, a relatively low shunt impedance connected across said cathode impedance and external to said anode cathode circuit and to reduce degeneration for the difference between the space currents of said devices, and means responsive to a control signal for applying a potential across said shunt impedance to differentially vary the potentials of said cathodes for producing the difference between the space currents of said devices substantially proportional to said control signal.

6. In a motor control circuit, a mixer amplifier for combining a pair of control signals to jointly control operation of a motor comprising a pair of electron discharge devices having their cathodes, control electrodes and anodes arranged in a balanced circuit with a power supply, a relatively high cathode impedance connected between said cathodes and said supply, a relatively low shunt impedance connected across said cathode impedance, means external to said anode cathode circuit and responsive to a first control signal for applying a potential across said shunt impedance to differentially vary the potentials of said cathodes according to said signal, and means responsive to a second control signal for applying a differential potential to said control electrodes according to said second control signal.

7. In a motor control circuit, a mixer amplifier for combining a pair of control signals to jointly control operation of a motor comprising a pair of electron discharge devices having their cathodes, control electrodes and anodes arranged in a balanced circuit with a power supply, a relatively high cathode impedance connected between said cathodes and said supply, a relatively low shunt impedance connected across said cathode impedance, means external to said anode cathode circuit and responsive to a first control signal for applying a potential across said shunt impedance to differentially vary the potentials of said cathodes according to said signal, and means responsive to a second control signal for applying a differential potential to said control electrodes according to said second control signal, said cathodes and control electrodes being interconnected to bias said devices in a manner such that the difference between their respective space currents is substantially proportional to the difference between the differential potentials applied to said cathodes and said control electrodes.

8. In a motor control circuit, a mixer amplifier for combining a pair of control signals to jointly control the operation of a motor comprising a pair of electron discharge devices arranged in a balanced circuit with their cathodes, control electrodes and anodes connected through symmetrical impedance networks to a source of potential, said impedance networks being arranged in a manner such that the space currents of said devices are substantially independent of potentials applied equally to said cathodes and respond solely to the potential differential of said cathodes, means external to said anode cathode circuit and responsive to a first control signal for varying the potential differential of said cathodes according to said first control signal, and means responsive to a second control signal for applying a differential potential to said control electrodes.

9. In a motor control circuit, a mixer amplifier for combining a pair of control signals to jointly control the operation of a motor comprising a pair of electron discharge devices arranged in a balanced circuit with their cathodes, control electrodes and anodes connected through symmetrical impedance networks to a source of potential, said impedance networks being arranged in a manner such that the space currents of said devices are substantially independent of potentials applied equally to said cathodes and respond solely to the potential differentials of said cathodes, means external to said anode cathode circuit and responsive to a first control signal for varying the potential differential of said cathodes, and means responsive to a second control signal for controlling the differential potential applied to said control electrodes, said devices being connected to said potential source in a manner such that the difference between the space currents of said devices is substantially proportional to the algebraic difference between said first and second signals.

10. A motor control system for operating a motor jointly by a pair of control signals comprising a pair of electron discharge devices arranged in a balanced circuit with their cathodes, control electrodes and anodes connected through symmetrical impedance networks to a source of potential, a first balanced control circuit for developing two unidirectional voltages of the same polarity, means external to said anode cathode circuit and for applying one of said unidirectional voltages to each of said cathodes, means for controlling the operation of said devices in a manner such that the space currents of said devices are controlled solely by the difference between said unidirectional voltages, and a second control circuit for applying unidirectional voltages to said control electrodes for further controlling said devices so the difference between their space currents is substantially proportional to the algebraic difference between the differential unidirectional voltages applied to their respective cathodes and control electrodes.

11. A motor control system for operating a motor jointly by a pair of control signals comprising a pair of electron discharge devices arranged in a balanced circuit with their cathodes, control electrodes and anodes connected through symmetrical impedance networks to a source of potential, a first balanced control circuit for developing two unidirectional voltages of the same polarity, means external to said anode cathode circuit and applying one of said unidirectional voltages to each of said cathodes, means in circuit with said cathodes for controlling the operation of said devices in a manner such that the space currents of said devices are controlled solely by the difference between said unidirectional voltages, and a second control circuit including a shunt circuit for applying unidirectional voltages to said control electrodes for further controlling said devices so the difference between their space currents is substantially proportional to the algebraic difference between the differential unidirectional voltages applied to their respective cathodes and control electrodes, and control means connected to the anode circuits of said electron discharge devices adapted to control the operation of a motor according to the difference between said space currents.

12. A motor control circuit for operating a motor jointly by two control signals comprising a first balanced control circuit for producing unidirectional voltages of the same polarity across two relatively low output impedances arranged symmetrically in a balanced circuit having a common cathode connection in said control circuit, a mixer amplifier having a pair of electron discharge devices arranged in a balanced circuit with their cathodes connected through relatively large impedances to a source of potential, and their control electrodes and anodes connected through symmetrically arranged impedances to the same source of potential, means external to said anode cathode circuit and for connecting said cathodes across said output impedances to control the space currents of said devices according to the voltage differential between said unidirectional voltages, a second control circuit including a shunting circuit for controlling the voltage differential applied to said control electrodes, said cathodes and control electrodes being connected to said potential source to bias said devices in a manner such that the difference between the space currents of said devices is substantially proportional to the difference between said voltage differences, and control means connected to said devices responsive to the difference between said space currents and adapted to control the operation of a motor.

13. In a balanced mixer amplifier for combining two signals by applying one in opposite polarity sense to the cathode and the other in opposite polarity sense to the control electrodes of a pair of electron discharge devices, an automatic bias circuit comprising degenerative means in the cathode circuits of said devices, and shunting means connected with the cathodes of said devices and to receive said one signal for reducing the effect of said degenerative means.

14. In a motor control circuit, a mixer amplifier comprising a pair of electron discharge devices each including a cathode, an anode and means for controlling the space currents passing through said devices, said cathodes and anodes being arranged in a balanced circuit with a power supply, a relatively high cathode impedance connected between the cathodes of said devices and said supply, and a relatively low shunting impedance external to said anode cathode circuit and connected across said cathode impedance, said high cathode and shunt impedances being selected to have a value, arranged, and connected together so that said high cathode impedance will provide degeneration for space currents passing equally through said devices while said shunt impedance will reduce said degeneration for differential variations between the space currents of said devices.

15. In a motor control circuit, a mixer amplifier comprising a pair of electron discharge devices each including a cathode, an anode and means for controlling the space currents passing through said devices, said cathodes and anodes being arranged in a balanced circuit with a power supply, a relatively high cathode impedance connected between the cathodes of said devices and said supply, and a relatively low shunting impedance external to said anode cathode circuit and connected across said cathode impedance, said high cathode and shunt impedances being selected to have a value arranged and connected together so that said high cathode impedance will provide degeneration for space currents passing equally through said devices while said shunt impedance will reduce said degeneration for differential variations between the space currents of said devices, and means for applying a control signal voltage across said shunt impedance differentially to vary the potentials of said cathodes whereby to produce a difference between the space currents of said devices dependent upon said signal voltage.

16. In a motor control circuit, a mixer amplifier comprising a pair of electron discharge devices each including a cathode and an anode, said cathodes and anodes being arranged in a balanced circuit with a power supply, including a cathode resistor for producing degeneration in said devices for cathode potentials applied equally to said cathodes, and shunting means including coupling means for differentially applied a control signal voltage to said cathodes for reducing said degeneration for the differentially applied signal voltages.

17. In a motor control circuit, a mixer amplifier comprising a pair of electron discharge devices each including a cathode, an anode and voltage-responsive means for controlling the space currents passing through said devices, said cathodes and anodes being arranged in a balanced circuit with a power supply, means including a cathode impedance for producing degeneration in said devices for cathode potentials applied equally to said cathodes, shunting means including means external to said anode cathode circuit and for differentially applying a first control signal voltage to said cathodes for reducing said degeneration for the differentially applied signal voltages, and means for differentially applying a second signal voltage to said signal voltage-responsive means whereby the difference between the spaced currents of said devices will be substantially proportional to the algebraic sum or difference between said first and second signal voltages.

18. In a motor control circuit, a mixer amplifier comprising a pair of electron discharge devices each including a cathode, an anode and means for controlling the space current passing through said devices, said cathodes and anodes being arranged in a balanced circuit with a power supply, a relatively high cathode impedance connected between said cathodes and said devices being biased in such manner that changes in voltage differentially applied to said control means produce substantially proportional changes in the difference between the space currents of said devices, a relatively low impedance external to said anode cathode circuit and connected between said cathodes, and means for applying a control signal voltage across said relatively low impedance whereby differentially to vary the potentials of said cathodes to produce a difference between the space currents of said devices substantially proportional to said applied control signal voltage.

19. In a balanced mixer, amplifier, a pair of push-pull connected electron discharge devices each including at least a cathode and an anode, means for applying a control voltage in opposite polarity sense to the cathodes of said devices, degenerative means including an impedance circuit connected between the cathodes of said devices for producing degeneration to voltages applied equally to said cathodes, and shunting means external to said anode cathode circuit and for reducing the degenerating effect of said last-mentioned means to voltages applied differentially to said cathodes.

20. A balanced mixer amplifier of the character recited in claim 19 in which the means for reducing the degenerating effect of the degenerative means is also connected between the cathodes of said devices.

21. In a motor control circuit, a mixer amplifier for combining a pair of control signals to jointly control the operation of a motor, comprising a pair of electron discharge devices arranged in a balanced circuit with their cathodes, control electrodes and anodes connected through symmetrical impedance networks to a source of potential, means for providing relatively high gain in said devices for signals differentially applied thereto but degeneration and low gain for voltages applied equally to the cathodes thereof, means external to said anode-cathode circuit for differentially applying control potentials to each of said cathodes to provide a difference in space currents in said devices proportional substantially solely to the difference between said control potentials, and means for applying other control potentials to said control electrodes for further controlling said space currents.

22. In a motor control circuit, a mixer amplifier for combining a pair of control signals to jointly control the operation of a motor comprising a pair of electron discharge devices arranged in a balanced circuit with their cathodes, control electrodes and anodes connected through symmetrical impedance networks to a source of potential, means for providing relatively high gain in said devices for signals differentially applied thereto but degeneration and low gain for voltages applied equally to the cathodes thereof, means external to said anode cathode circuit and differentially applying control potentials to each of said cathodes to provide a difference in space currents in said devices proportional substantially solely to the difference between said control potentials, and means for applying other control potentials to each of said control electrodes, said cathodes and said control electrodes being connected in a manner such that the difference between said space currents is substantially proportional to the algebraic difference between the differential potentials applied to said cathodes and said control electrodes.

RAYMOND C. GOERTZ.

REFERENCES CITED

The following references are of record in the file of this patent:

UNITED STATES PATENTS

| Number | Name | Date |
|---|---|---|
| 1,547,392 | Hewlett et al. | July 28, 1925 |
| 2,147,674 | Satterlee | Feb. 21, 1939 |
| 2,296,107 | Kimball | Sept. 15, 1942 |
| 2,399,695 | Satterlee | May 7, 1946 |
| 2,425,009 | Shepherd | Aug. 5, 1947 |
| 2,478,203 | McCoy | Aug. 9, 1949 |